No. 749,322. PATENTED JAN. 12, 1904.
F. B. POPE.
PROCESS OF TREATING OILS.
APPLICATION FILED FEB. 3, 1902.
NO MODEL. 2 SHEETS—SHEET 2.
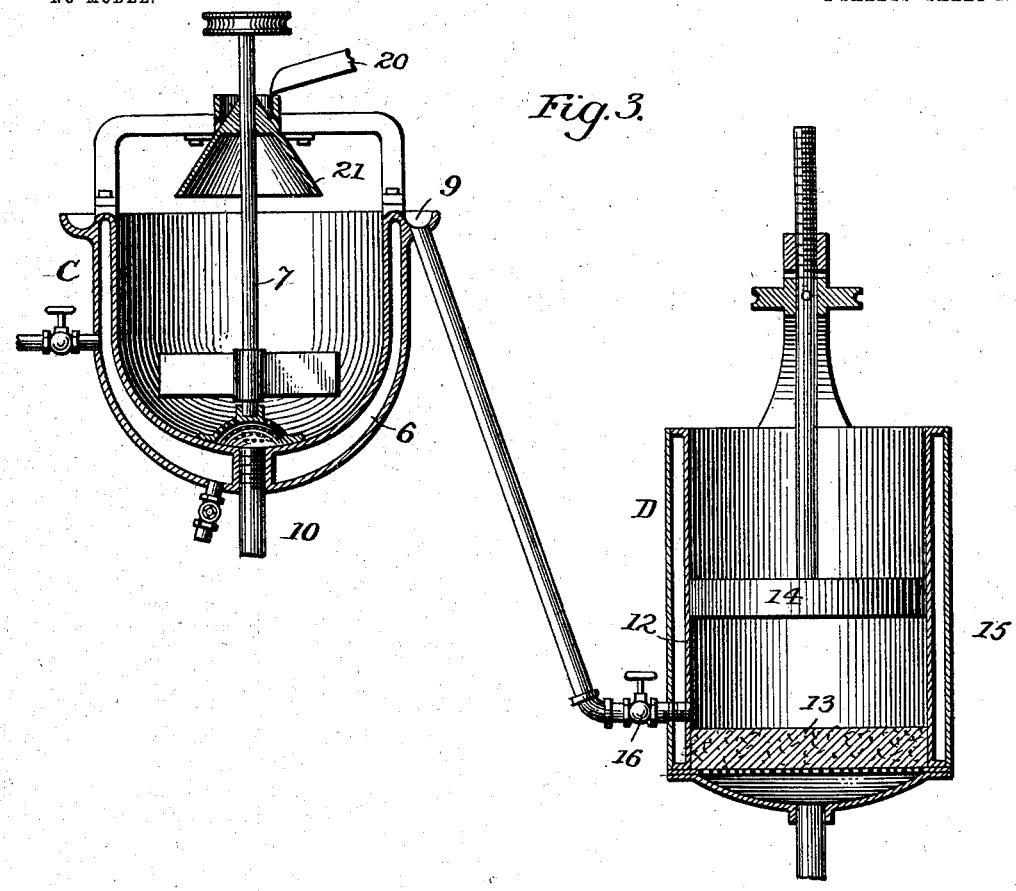
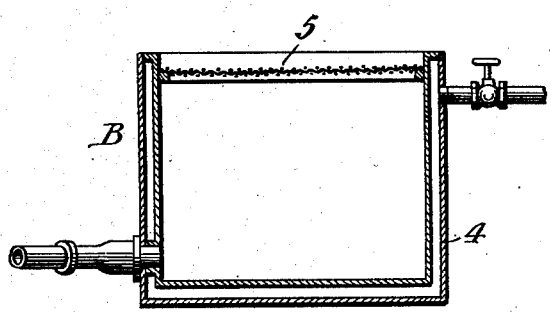

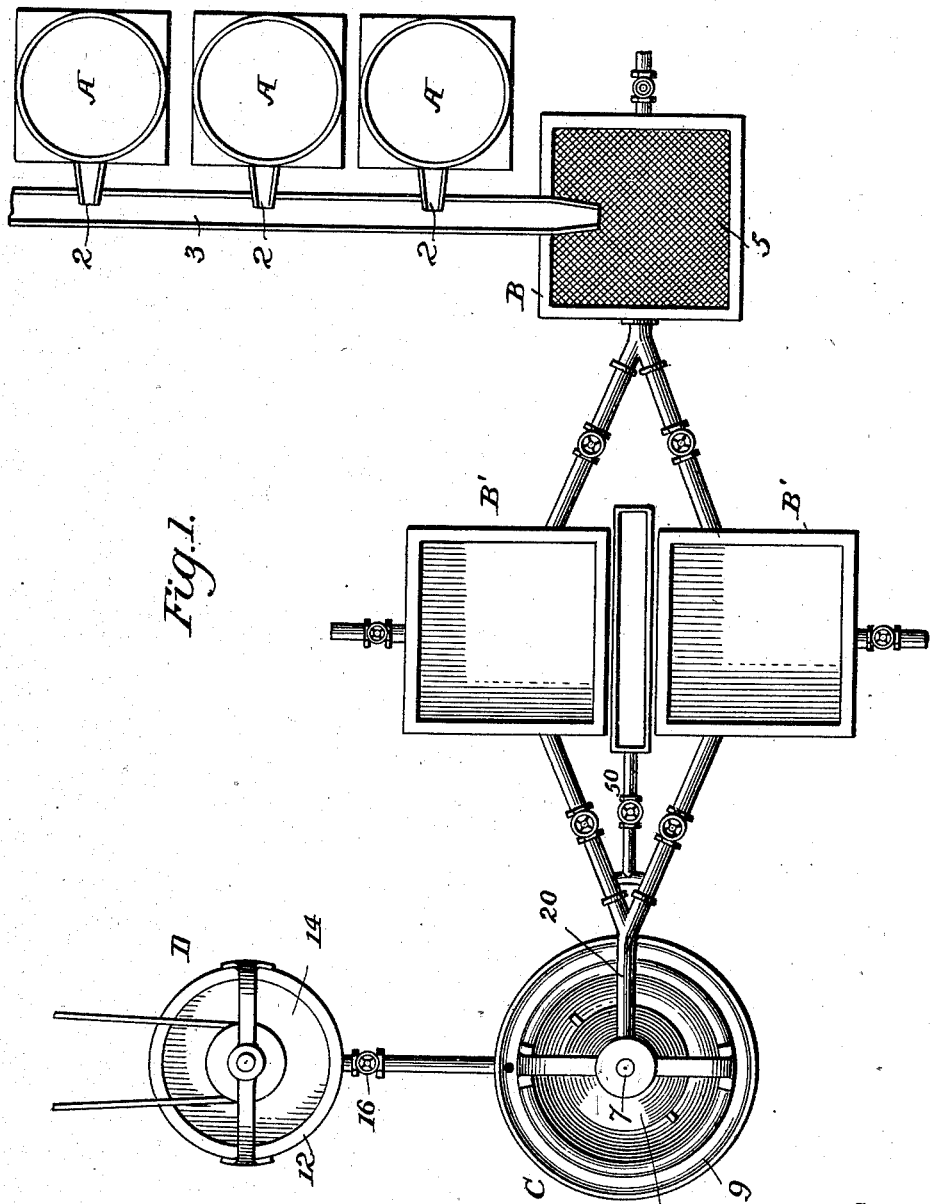

No. 749,322. Patented January 12, 1904.

UNITED STATES PATENT OFFICE.

FREDERICK B. POPE, OF AUGUSTA, GEORGIA, ASSIGNOR OF ONE-HALF TO MAGNUS SWENSON, OF CHICAGO, ILLINOIS, AND LAMAR L. FLEMING, OF NEW YORK, N. Y.

PROCESS OF TREATING OILS.

SPECIFICATION forming part of Letters Patent No. 749,322, dated January 12, 1904.

Application filed February 3, 1902. Serial No. 92,448. (No specimens.)

*To all whom it may concern:*

Be it known that I, FREDERICK B. POPE, a citizen of the United States, residing at Augusta, in the county of Richmond and State of Georgia, have invented certain new and useful Improvements in Treating Oils, of which the following is a specification.

This invention relates more particularly to treating crude cotton-seed oil, which is obtained, according to current practice, by heating the rolled or crushed kernels of the cotton-seed to a suitably high temperature—say 150° to 160° Fahrenheit, but more frequently as high as 240° to 250° Fahrenheit—and extracting the oil from the hot seed by pressure in suitable presses; but the invention extends also to the treatment of analogous oils.

Heretofore the crude oil from the presses has been cooled and stored until it may be convenient to subject it to the chemical operation for refining the same. This operation consists ordinarily in agitating the crude oil at an elevated temperature with a solution of caustic soda or of soda-ash and then decanting the oil from the residue, commonly known as "soap-stock," which settles out on standing. Other alkali, as potash, could be used in place of soda; but the latter is that which has been found most suitable and economical.

I have discovered that the crude oil during storage undergoes certain changes whereby free acid is developed, which requires an increase in the quantity of alkali for the chemical treatment and in the development of which more or less good oil is apt to be destroyed.

Every seed contains the embryo of the new plant in a cell or sack, wherein it is embedded in albuminous material. This albuminous material is very susceptible to spontaneous change under the influence of warmth and moisture, and as some sugar and soluble starch is always present the conditions are very favorable under access of air to fermentation, which results in the formation of free acid. Moreover, a hydrolizing action is apt to take place on the glycerin of the oil, whereby the acid combined therewith is liberated and added to the free acid which is the product of fermentation. The free acid consists, therefore, of quite a number of acids, and it all has to be neutralized both on its own account and in order that the coloring-matter, which is insoluble in the neutral liquid, may precipitate.

I have further discovered that the formation of free acid and the consequent waste can be lessened or avoided by treating the crude oil after it leaves the press to a high temperature without any extended interval of standing at low temperature, such as would be liable to develop the fermentation or the hydrolizing action (either or both) before referred to, the high temperature being maintained until the oil has been subjected to the appropriate chemical treatment for the removal of free acid and other impurities. After this treatment the oil can be stored without the same danger of developing free acid, since the fermentable material and the hydrolizing agent will have been removed. The chemical treatment may consist, as heretofore, of an agitation with alkaline solution at an elevated temperature; but I have found it to be an advantage and special improvement to effect the agitation and separation of the oil (either or both) in a continuous manner, the separation being effected as cream is separated from milk—for example, in a centrifugal separator or in any appropriate form of separator. Such a separation may precede or follow the addition of the alkali to the crude oil.

I have also discovered that it is most advantageous to force the separated oil through a porous filtering-body.

The invention consists in the several new steps and the several new combinations of steps (old or new) hereinbefore or hereinafter set forth.

In the accompanying drawings I have illustrated an apparatus embodying my invention.

In said drawings, Figure 1 is a plan view of the apparatus; Fig. 2, a sectional elevation of one of the receiving-tanks; Fig. 3, a sectional elevation of the separator and filter.

The presses A A are of any usual or suitable character and of any number, the seed being subjected to such pressure as will cause the liquid extract to flow from the spouts 2 into a conducting-gutter 3, which discharges the liquid into a tank B. The tank B has a jacket 4, to which is admitted hot air or steam, so as to increase the temperature (or to preserve the temperature if the oil is already sufficiently hot) of the oil which flows from the presses up to refining temperature, and across the tank extends a perforated plate or sheet of wire-cloth 5, which constitutes a strainer, straining out any solid particles.

With the tank B may communicate any suitable number of other tanks B' B' similar to B, except that the screener is not in the tanks B', the object of a plurality of tanks being to enable the operator to direct the discharge from one tank to another if he finds that the oil changes in its quality or character, which is apt to be the case. These tanks B' B' are also heated in order to maintain the oil at refining temperature. Each tank B' communicates with the separator C. This may be any suitable form of gravity-separator. As shown, there is a jacketed vessel 6, heated by steam or hot air or otherwise, with a rotating shaft 7, carrying blades which impart rotation to the material fed to the vessel, so that the light oil flows to the top and over the rim to a conductor 9, while the heavier foreign matters settle at the bottom and flow out at the discharge 10. From the conductor 9 the oil passes to the casing 12 of the filter D. In this casing is a filter-bed 13, preferably of clay, and a piston 14 is lifted to permit the admission of the oil. A cock 16 is then closed and the piston forced downward with a powerful pressure, forcing the oil through the filter-bed. The filter is heated by a steam or hot-air jacket 15. The oil either before or after passing to the separator is treated chemically, as before described. The material for effecting the chemical action may be fed to the separator or to the feed-pipes from a pipe 50 simultaneously with the oil. The material introduced may be a solution of caustic soda in water, one pound of caustic soda of seventy-four per cent. to one gallon (or better to two gallons) of water, and the amount should be enough for the soda therein to neutralize all the free or uncombined acid and to form sufficient soap to entrap the red-brown flakes of coloring-matter and protect them from contact with the oil while sinking to the bottom. The amount of caustic soda is regulated by the content of free acid. The best crude oil from fresh ripe seeds would ordinarily have such a content of free acid as to take about one pound of seventy-four per cent. caustic soda to five hundred and fifty pounds of oil. Some inferior qualities of crude oil might take ten times as much or even more than ten times as much caustic soda. The refiner skilled in the art will be able to ascertain the amount needed. The solution of caustic soda could be added gradually, with agitation, to a sample of the crude oil and the operation carefully watched to see when the proper refining is effected, so as to avoid an undue excess of caustic soda, since this would destroy a corresponding amount of good oil. The results of the assay will enable the refiner to fix the rate at which the caustic-soda solution should be delivered through the pipe 50 into a given grade of oil.

I have found that the sooner the oil is operated upon after leaving the press the more readily and effectually is the separation effected and that the temperature would best not be allowed to decrease during the operation. It is also important to have the oil in a heated condition when treated chemically to act on the foreign ingredients.

From the foregoing description it will be seen that the oil after leaving the press is not allowed to cool or to remain quiescent for any extended period until after it has passed through the refining apparatus.

Any number of filter-presses D may be employed, each being connected to the conductor or trough 9, and the separator can thus be kept constantly running. The flow from the trough 3 through the tank B and one or the other of the tanks B' to the separator can also be practically continuous.

While the oil may be discharged directly into the separator C at one point, I have found that it is best to distribute it uniformly around the central shaft, and I therefore surround the latter by a fixed conical distributer 21, onto which the oil is discharged from the conductor 20 and over which it is spread and from the lower edge of which it falls into the separator. This distributer may of course be constructed in different ways.

Without limiting myself to the precise operations and apparatus shown, I claim—

1. The herein-described process of treating oil, which consists in heating the oil to a high temperature immediately after it leaves the press, and then separating the oil from the free acid and other impurities while in such heated condition, substantially as set forth.

2. The herein-described process of treating oil, which consists in maintaining a substantially continuous flow of oil from a press through a refining apparatus, and heating the oil and maintaining the heat during the flow of oil through the apparatus, substantially as set forth.

3. The herein-described process of refining oil, which consists in heating the oil immediately after it leaves the press to a high temperature, and thereafter separating the heavier impurities from the oil, substantially as set forth.

4. The herein-described process of treating oil, which consists in heating the oil immediately after it leaves the press, separating the heavier impurities from the oil, and then mechanically forcing the separated oil through a porous filtering-body, substantially as set forth.

5. The improvement in refining oil consisting in effecting in a continuous manner the agitation of the oil with the chemical reagent for neutralizing free acid and the separation of the oil from the reaction products, including precipitated coloring-matter, substantially as described.

6. The process of treating oil, consisting in heating the oil to a high temperature immediately after it leaves the press, and while it is at an elevated temperature separating it in a continuous manner from impurities therein, substantially as described.

In testimony whereof I have signed my name to this specification in the presence of two subscribing witnesses.

FREDERICK B. POPE.

Witnesses:
 A. S. REYNOLDS,
 R. W. ROOD